US009139278B1

(12) United States Patent
Roach et al.

(10) Patent No.: US 9,139,278 B1
(45) Date of Patent: Sep. 22, 2015

(54) METHODS AND SYSTEMS FOR TURNING AN ENVELOPE INTO A PARACHUTE

(71) Applicant: Google Inc., Mountain View, CA (US)

(72) Inventors: Kevin Roach, Mountain View, CA (US); Richard Wayne DeVaul, Mountain View, CA (US); Anton Valdemar Staaf, Mountain View, CA (US)

(73) Assignee: Google Inc., Mountain View, CA (US)

( * ) Notice: Subject to any disclaimer, the term of this patent is extended or adjusted under 35 U.S.C. 154(b) by 185 days.

(21) Appl. No.: 14/042,009

(22) Filed: Sep. 30, 2013

(51) Int. Cl.
*B64B 1/40* (2006.01)

(52) U.S. Cl.
CPC .......................................... *B64B 1/40* (2013.01)

(58) Field of Classification Search
CPC ......... B64D 17/62; B64D 17/72; B64D 17/80
USPC ................. 244/139, 149, 150, 151 B, 173.3; 280/728.1, 701.45; 294/82.25
See application file for complete search history.

(56) References Cited

U.S. PATENT DOCUMENTS

| 3,679,155 | A | * | 7/1972 | Centofanti | 244/32 |
| 4,651,956 | A | * | 3/1987 | Winker et al. | 244/99 |
| 5,149,019 | A | * | 9/1992 | Stenlund | 244/145 |
| 2002/0175243 | A1 | * | 11/2002 | Black et al. | 244/97 |
| 2004/0238692 | A1 | * | 12/2004 | Kavanagh | 244/152 |
| 2005/0224639 | A1 | * | 10/2005 | Kavanagh | 244/31 |

* cited by examiner

*Primary Examiner* — Justin Benedik

(74) *Attorney, Agent, or Firm* — McDonnell Boehnen Hulbert & Berghoff LLP

(57) ABSTRACT

The present disclosure provides a method and apparatus for turning an envelope of a balloon into a parachute. The balloon may include a payload, an envelope filled with a lift gas, and a parachute system. The parachute system may include a fuse couple to the envelope. The parachute system may also include an activation system coupled to the fuse. The activation system may be configured to ignite the fuse. The fuse may be ignitable to melt through at least a portion of the envelope to separate an upper portion of the envelope from a lower portion of the envelope. The upper portion of the envelope may be coupled to the payload such that when separated from the lower portion, the upper portion performs as a parachute for the payload.

20 Claims, 9 Drawing Sheets

METHODS AND SYSTEMS FOR TURNING AN ENVELOPE INTO A PARACHUTE

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, the present disclosure provides a balloon. The balloon may include a payload, an envelope filled with a lift gas, and a parachute system. The parachute system may include a fuse coupled to the envelope. The parachute system may also include an activation system coupled to the fuse. The activation system may be configured to ignite the fuse. The fuse may be ignitable to melt through at least a portion of the envelope to separate an upper portion of the envelope from a lower portion of the envelope. The upper portion of the envelope may be coupled to the payload such that when separated from the lower portion, the upper portion performs as a parachute for the payload.

In another aspect, the present disclosure provides a method. The method may include receiving an indication that a balloon should deploy a parachute. Responsive to the received indication, the method may also include igniting a fuse coupled to an envelope of the balloon via an activation system. The fuse may be ignitable to melt through at least a portion of the envelope to separate an upper portion of the envelope from a lower portion of the envelope. The upper portion of the envelope may be coupled to the payload such that when separated from the lower portion, the upper portion performs as a parachute for the payload.

In yet another aspect, the present disclosure provides an apparatus. The apparatus may include a fuse coupled to an envelope of a balloon. The apparatus may also include a resistance wire coupled to the fuse. The apparatus may also include a power source connected to the resistance wire, wherein the power source connected to the resistance wire is configured to ignite the fuse. The fuse may be ignitable to melt through at least a portion of the envelope to separate an upper portion of the envelope from a lower portion of the envelope. The upper portion of the envelope may be coupled to the payload such that when separated from the lower portion, a bottom surface of the upper portion of the envelope creates drag to slow the descent of the payload and the upper portion.

These as well as other aspects, advantages, and alternatives, will become apparent to those of ordinary skill in the art by reading the following detailed description, with reference where appropriate to the accompanying drawings.

DETAILED DESCRIPTION

Figure 1:
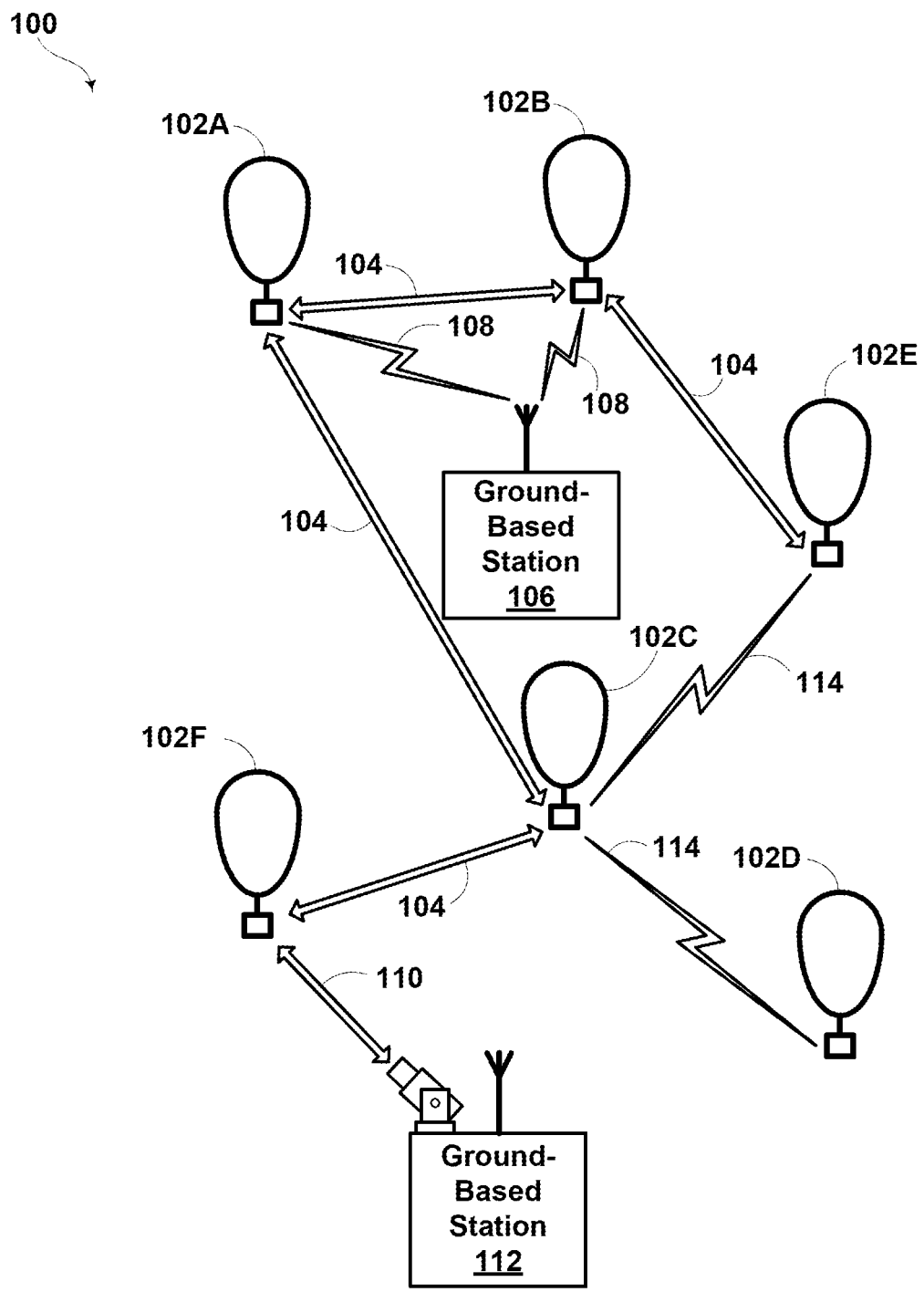
FIG. 1 is a simplified block diagram illustrating a balloon network, according to an example embodiment.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

I. Overview

Example embodiments may generally relate to a data network formed by balloons, and in particular, to a mesh network formed by high-altitude balloons deployed in the stratosphere. In order that the balloons can provide a reliable mesh network in the stratosphere, where winds may affect the locations of the various balloons in an asymmetrical manner, the balloons in an exemplary network may be configured move latitudinally and/or longitudinally relative to one another by adjusting their respective altitudes, such that the wind carries the respective balloons to the respectively desired locations. Note, however, that example embodiments may also relate to a balloon generally, such as to a high-altitude balloon.

Various types of balloon systems may be incorporated in an exemplary balloon network. An exemplary embodiment may utilize high-altitude balloons, which typically operate in an altitude range between 18 km and 25 kilometers. In an exemplary embodiment, such high-altitude balloons may include an envelope, and a payload, along with various other components.

An exemplary balloon may also include a parachute system configured to enable the balloon to descend safely to the ground. This functionality may be utilized when the payload needs to be accessed on the ground, such as when it is time to remove the balloon from a balloon network, when maintenance is due on systems within the payload, and/or when the power supply needs to be recharged or replaced. This functionality may also be used in other situations, such as when the balloon encounters severe weather and must quickly descend to avoid serious damage to the balloon, for example.

Adding existing parachute systems to a balloon may be costly, complex, and add significant weight to the balloon system. Therefore, a more cost effective and simple parachute system may be desirable. Accordingly, an example system may make use of material from the envelope as part of a parachute system. By using material from the envelope for the parachute system, the weight and/or cost of a balloon may be reduced.

In one embodiment, the upper portion of the envelope of the balloon may be used as a parachute by cutting away the lower portion of the envelope. The balloon may include a fast burning fuse that forms a path that traverses the circumference of the envelope. The fuse may be secured to the outside of the envelope by tape, glue, or by some other means. In another example, the fuse may be either partially or fully embedded in the envelope. When the fuse is ignited, the fuse is configured to melt the thin film plastic of the envelope, creating a parachute from the upper portion of the envelope. The bottom surface of the upper portion of the envelope may be configured to create drag to slow the descent of the payload and the upper portion. To activate the fuse, a resistance wire may be wrapped around the fuse and connected to a power source. The power source provides current through the resistance wire to create heat and activate the fuse. Other activation systems are possible as well.

Further, the apex of the envelope may also be opened, creating a hole at the top of the envelope and allowing lift gas to escape from the top of the envelope. The hole at the apex of the envelope may be created by a rip panel, or by using an extension of the same line of fuse used to cut the parachute. If the same line of fuse is used, the vertical portion of the ignition system may be backed with a heat shield of flame retardant material to protect the film plastic of the envelope below. The ignition may be made redundant and cutting time of the parachute may be shortened by running multiple lines of fuse down from the apex to the latitudinal cut line. In one embodiment, the hole at the apex of the envelope is created before cutting the parachute to create a zero pressure envelope before activation. As the lift gas escapes from the top of the envelope and the opening in the middle of the envelope, the balloon begins to descend, replacing the lift gas in the parachute with ambient air.

In some examples, the lift gas may be flammable. However, if the fuse is activated at high altitude where there is little oxygen, combustion of the lift gas will not likely occur.

It should be understood that the above examples are provided for illustrative purposes, and should not be construed as limiting. As such, the method additionally or alternatively includes other steps or includes fewer steps, without departing from the scope of the invention.

II. Example Balloon Networks

Example embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For instance, the balloons may be configured for optical communications using lasers and/or ultra-bright LEDs (which are also referred to as "high-power" or "high-output" LEDs). In addition, the balloons may communicate with ground-based station(s) using radio-frequency (RF) communications.

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with one or more other balloons via free-space optical links. Further, some or all of the balloons in such a network, may additionally be configured to communicate with ground-based and/or satellite-based station(s) using RF and/or optical communications. Thus, in some embodiments, the balloons may be homogenous in so far as each balloon is configured for free-space optical communication with other balloons, but heterogeneous with regard to RF communications with ground-based stations.

In other embodiments, a high-altitude-balloon network may be heterogeneous, and thus may include two or more different types of balloons. For example, some balloons in a heterogeneous network may be configured as super-nodes, while other balloons may be configured as sub-nodes. It is also possible that some balloons in a heterogeneous network may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context. Further, some balloons, which may be super-nodes in an example embodiment, can be configured to communicate via optical links with ground-based stations and/or satellites.

In an example configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations can be modelled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area.

Further, in some embodiments, some or all balloons may be continually moving while at the same time maintaining desired coverage over the ground (e.g., as balloons move out of an area, other balloons move in to take their place). In such an embodiment, a station-keeping process may in fact take the form of fleet-planning process that plans and coordinates the movement of the balloons. Other examples of station-keeping are also possible.

C. Control of Balloons in a Balloon Network

Figure 2:
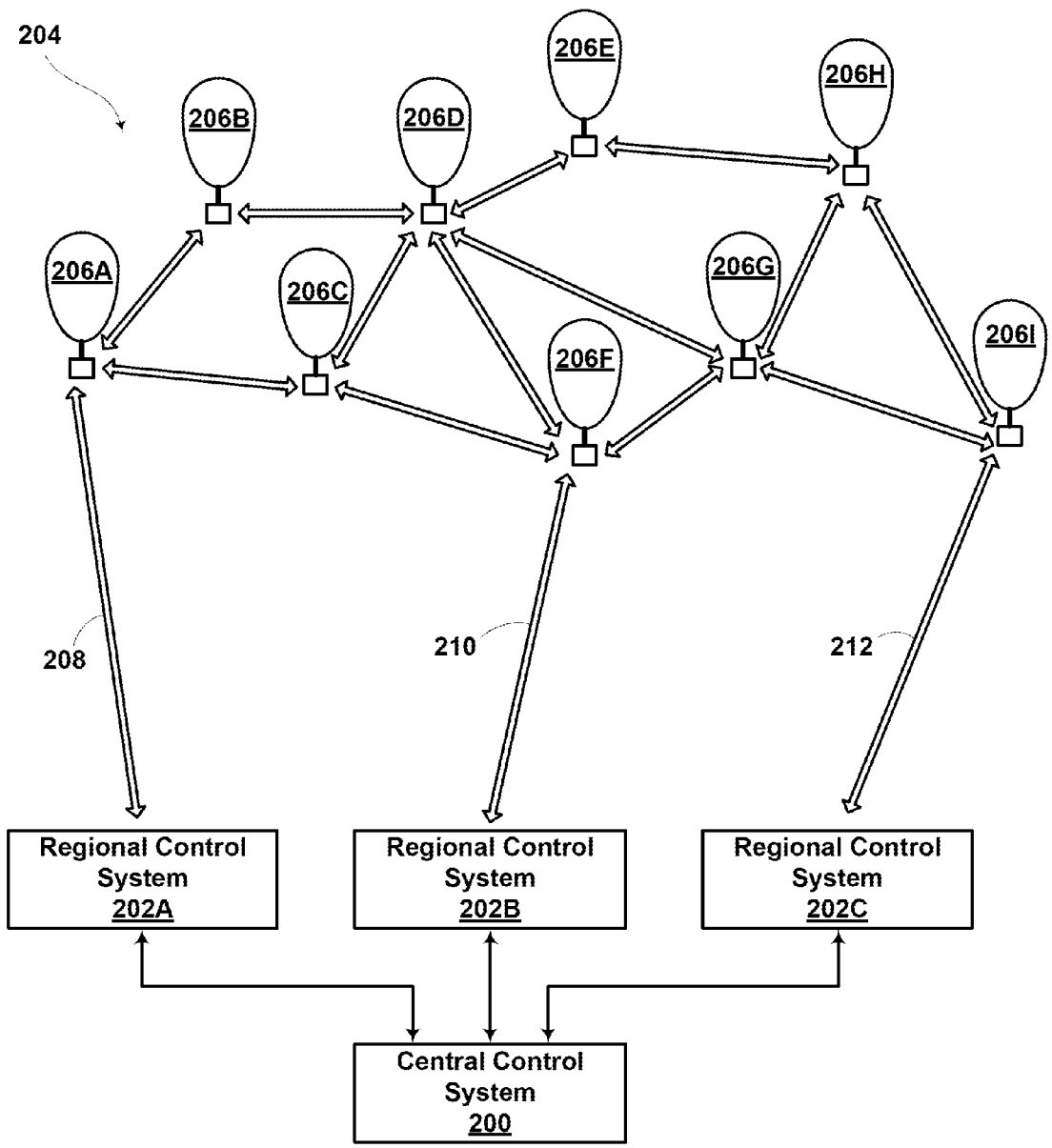
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

Further, control systems such as those described above may determine when and/or where individual balloons should be taken down. Additionally, the control systems may navigate the balloons to locations where they are to be taken down. The control systems may also cause the balloons to be taken down, and may control their descent and/or otherwise facilitate their descent.

III. Exemplary Balloon Configuration

Figure 3:
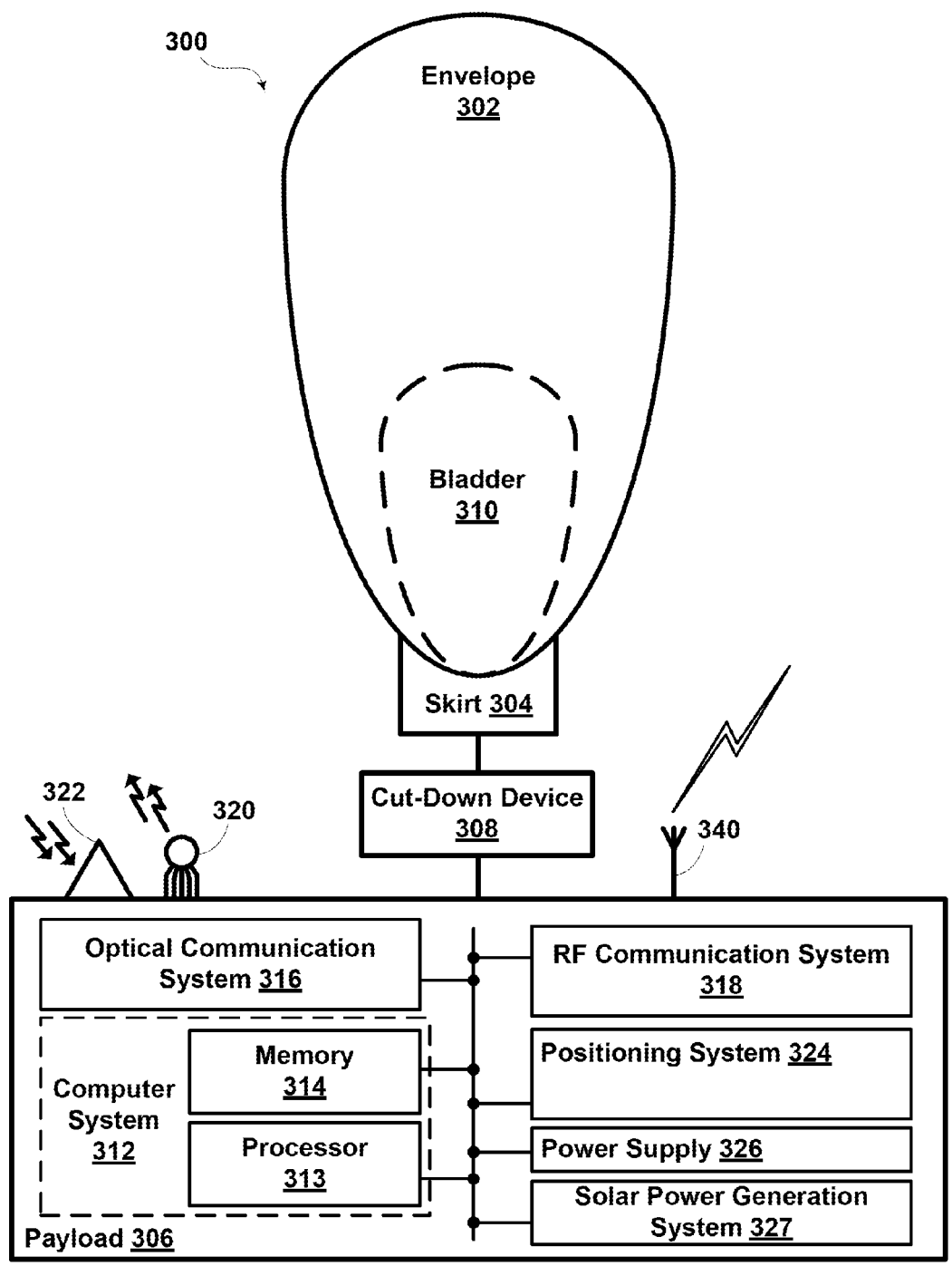
FIG. 3 is a simplified block diagram illustrating a high-altitude balloon, according to an example embodiment.

Various types of balloon systems may be incorporated in an example balloon network. As noted above, an example embodiment may utilize high-altitude balloons, which could typically operate in an altitude range between 18 km and 25 km. FIG. 3 shows a high-altitude balloon 300, according to an example embodiment. As shown, the balloon 300 includes an envelope 302, a skirt 304, a payload 306, and a cut-down device 308, which is attached between the balloon 302 and payload 304.

The envelope 302 and skirt 304 may take various forms, which may be currently well-known or yet to be developed. For instance, the envelope 302 and/or skirt 304 may be made of materials including metalized Mylar or BoPet. Additionally or alternatively, some or all of the envelope 302 and/or skirt 304 may be constructed from a highly-flexible latex material or a rubber material such as chloroprene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a computer system 312, which may include a processor 313 and on-board data storage, such as memory 314. The memory 314 may take the form of or include a non-transitory computer-readable medium. The non-transitory computer-readable medium may have instructions stored thereon, which can be accessed and executed by the processor 313 in order to carry out the balloon functions described herein. Thus, processor 313, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down device 308. The cut-down device 308 may be activated to separate the payload 306 from the rest of balloon 300. The cut-down device 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down device. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft. In yet another embodiment, the balloon may include a parachute system configured to enable the balloon 300 and payload 306 to descend safely to the ground.

IV. Example Parachute System

As discussed above, each balloon in the balloon network may include a parachute system, which may be configured to enable the balloon and payload to descend safely to the ground. This functionality may be utilized when the payload needs to be accessed on the ground, such as when it is time to remove the balloon from a balloon network, when maintenance is due on systems within the payload, and/or when the power supply needs to be recharged or replaced. This functionality may also be used in other situations, such as when the balloon encounters severe weather and must quickly descend to avoid serious damage to the balloon, for example.

Adding existing parachute systems to a balloon may be costly, complex, and add significant weight to the balloon system. Therefore, a more cost effective and simple parachute system may be desirable. Accordingly, an example system may make use of material from the envelope as part of a parachute system. By using material from the envelope for the parachute system, the weight and/or cost of a balloon may be reduced.

Figure 4A:
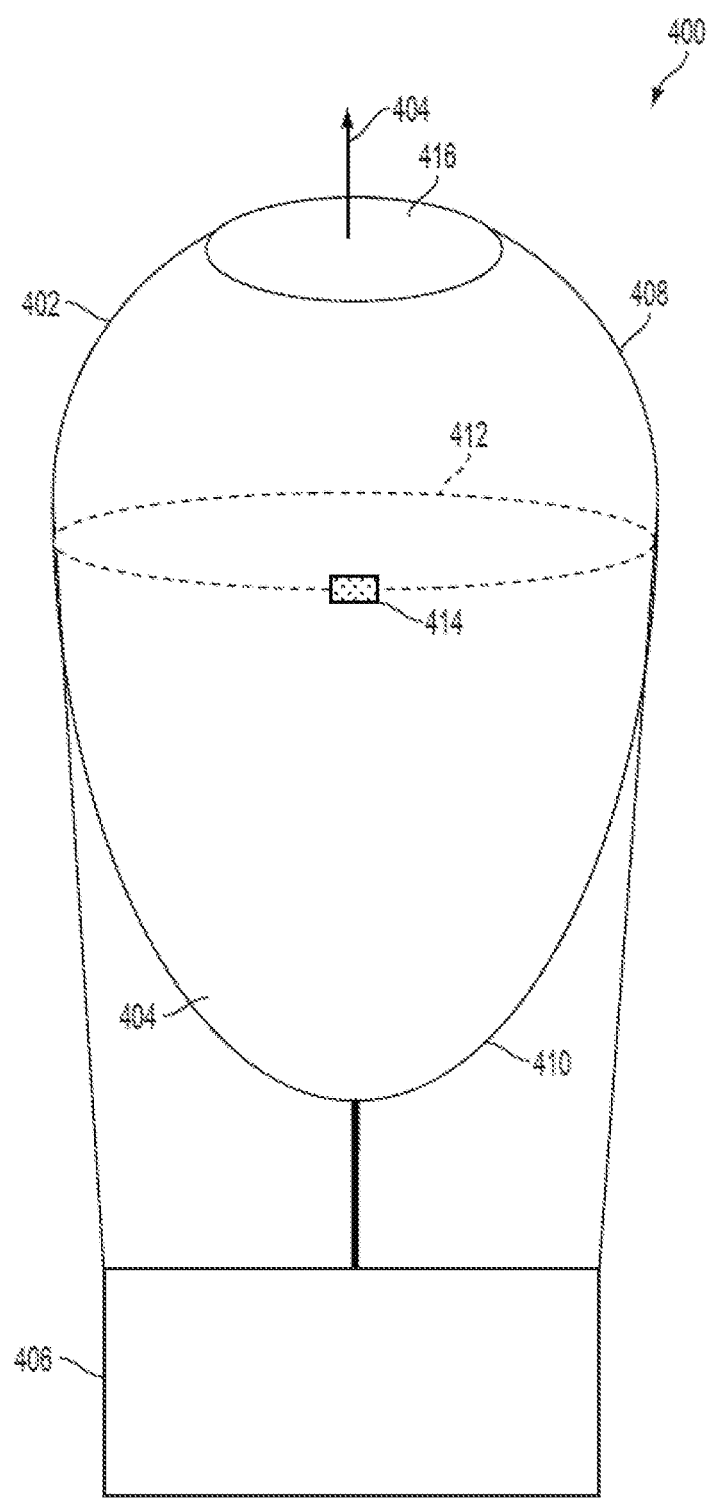
FIG. 4A is a side view of an example parachute system, according to an exemplary embodiment.

FIG. 4A illustrates a side view of an example parachute system of a balloon 400, according to an exemplary embodiment. Balloon 400 includes an envelope 402 filled with a lift gas 404, carrying a payload 406. The envelope 402 may be constructed from a highly-flexible latex material or a rubber material such as chloroprene. Other materials are also possible. Further, the shape and size of the envelope 402 may vary depending upon the particular implementation. The envelope 402 may be filled with a lift gas 404, such as helium and/or hydrogen. Other types of gases or combinations of gases are possible as well.

In one embodiment, the upper portion 408 of the envelope 402 of the balloon 400 may be used as a parachute by cutting away the lower portion 410 of the envelope 402. In order to cut away the lower portion 410 of the envelope 402, the balloon 400 may include a fuse 412 that is run along a substantially latitudinal line around the envelope 402. The fuse 412 may be a fast burning fuse, and may include a core of black powder with one or more textile overwraps, as an example. The black powder may include a mixture of sulfur, charcoal, and potassium nitrate. The outer layers of the fuse 412 may be coated with wax or nitrocellulose lacquer for water resistance. In another example, the outer layers of the fuse 412 may be surrounded by a mesh metal sleeve. The mesh metal sleeve transfers the heat from the ignited fuse 412 to the mesh metal sleeve to cut the envelope 402, but protects the fuse 412 from igniting the lift gas 404. In another embodiment, the lower portion 410 of the envelope 402 may be cut away by passing current through a resistance wire on the envelope 402, thereby heating the resistance wire and melting the envelope 402. In yet another embodiment, the envelope 402 may be chemically treated in the areas where the envelope 402 will be cut. The chemically treated areas may then be exposed to a chemical configured to react with the treated areas to cut through the envelope 402. Other means of cutting the envelope 402 are possible as well.

When the fuse 412 is ignited, the fuse 412 is configured to melt through the material of the envelope 402, cutting away the lower portion 410 of the envelope 402, and creating a parachute from the upper portion 408 of the envelope 402. The bottom surface of the upper portion 408 of the envelope 402 is configured to create drag to slow the descent of the payload 406 and the upper portion 408. In one example, the fuse 412 may run along a substantially latitudinal line at the equator of the envelope 402. In another example, the fuse 412 may run along a substantially latitudinal line above the equator of the envelope 402. In yet another example, the fuse 412 may run along a substantially latitudinal line below the equator of the envelope 402. Once cut away, the lower portion 410 of the envelope 402 may descend safely to the ground, or may simply hang from the payload 406. In one example, the fuse 412 may be secured to the envelope 402 by tape, and the ignited fuse 412 may be configured to melt through both the material of the envelope 402 and the tape. In another example, the fuse 412 may be secured to the envelope 402 by glue. In yet another example, the fuse 412 may be either partially or fully embedded in the envelope 402. Other means of securing the fuse 412 to the envelope 402 are possible as well.

The balloon 400 may also include an activation system 414 configured to ignite the fuse 412. To activate the fuse 412, the activation system 414 may include a resistance wire may be wrapped around the fuse and connected to a power source. In one example, the resistance wire may be a 32 BNC nichrome resistance wire. The power source may be configured to provide a current through the resistance wire to create heat and ignite the fuse 412. The power source may include a 5V power supply module located near the resistance wire of the activation system 414. In another embodiment, with reference to FIG. 3, the power source may simply be the power supply 326 of the payload 306. Other power sources and activation systems are possible as well.

In one embodiment, the activation system may be controlled remotely. For example, the application of the power source used to apply a current to the resistance wire may be controlled at ground level. In another embodiment, the activation system may be controlled by the processor of the balloon. Other embodiments are possible as well.

Further, the apex of the envelope 402 may also be opened, creating a hole 416 at the top of the envelope 402 to allow the lift gas 404 to escape from the top of the envelope 402. In one example, the hole 416 at the apex of the envelope 402 may be created by a rip panel. The rip panel may include a simple large sleeve at the apex of the balloon 400 that is drawn into a bunch and tied off with a cord. The cord may be cut remotely by an electrically actuated explosive squib cannon or by some other means. In another embodiment, the rip panel may include a circular panel held in place at the apex of the balloon 400 with a hook-and-loop (e.g., Velcro) closure that can be opened and closed remotely to allow the lift gas 404 to escape from the envelope 402. Other configurations of the rip panel are possible as well.

In another embodiment, the hole 416 at the apex of the envelope 402 may be created by using an extension of the same line of fuse 412 used to cut the parachute, as discussed below in relation to FIGS. 4B and 4C. In one embodiment, the hole 416 at the apex of the envelope 402 is created before cutting the parachute to create a zero pressure envelope 402 before activation of the parachute. As the lift gas 404 escapes from the top of the envelope 402 and the parachute is created by cutting away the lower portion 410 of the envelope 402, the balloon 400 begins to descend, replacing the lift gas 404 in the parachute with ambient air.

In some examples, as described above, the lift gas 404 may be flammable. However, if the fuse 412 is activated at high altitude where there is little oxygen, combustion of the lift gas 404 will not likely occur.

Figure 4B:
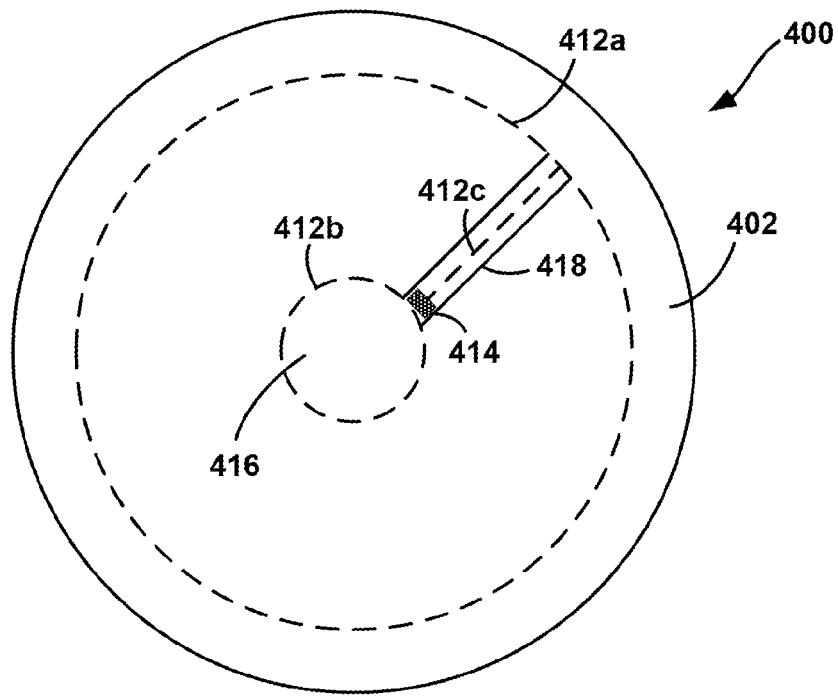
FIG. 4B is a top view of an example parachute system, according to an exemplary embodiment.

FIG. 4B illustrates a top view of an example parachute system of a balloon 400, according to an exemplary embodiment. As discussed above, the apex of the envelope 402 may also be opened, creating a hole 416 at the top of the envelope 402 to allow the lift gas 404 to escape from the top of the envelope 402. The hole 416 at the apex of the envelope 402 may be created by using an extension of the same line of fuse used to cut the parachute. In particular, a first fuse 412a may be coupled to the envelope 402 along a substantially latitudinal line near the equator of the envelope 402, and a second fuse 412b may be coupled to the envelope 402 along a substantially latitudinal line around a top portion of the envelope 402. Further, a third fuse 412c may couple the first fuse 412a to the second fuse 412b.

The third fuse 412c may be backed with a heat shield 418 of flame retardant material to protect the material of the envelope below. The heat shield may include a woven polyethylene tarp, coated nylon, carbon foam, wool or other flame retardant materials. In operation, the heat shield 418 prevents the third fuse 412c from melting the envelope 402, ensuring only two latitudinal cuts are made on the envelope 402.

Figure 4C:
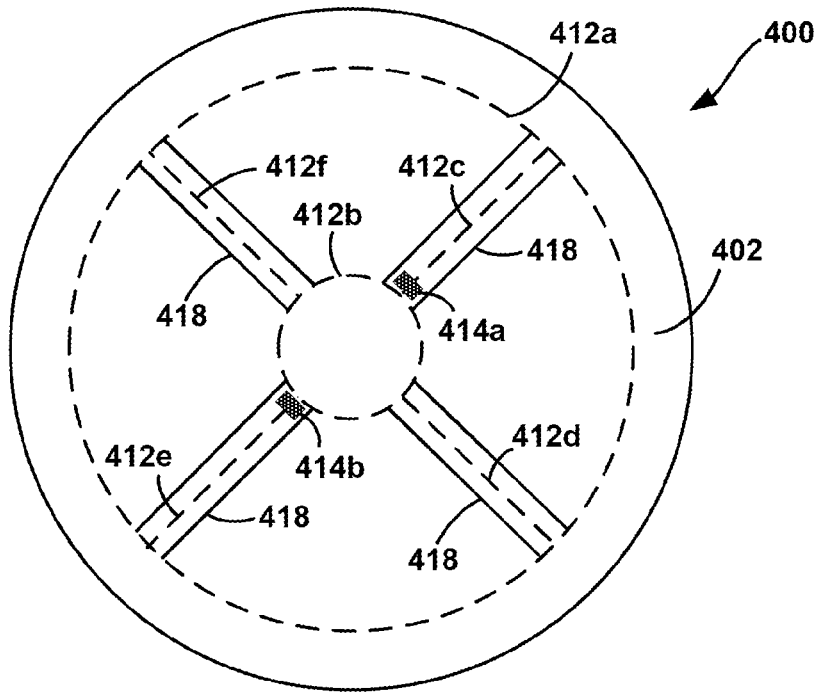
FIG. 4C is a top view of another example parachute system, according to an exemplary embodiment.

FIG. 4C illustrates a top view of another example parachute system of a balloon 400, according to an exemplary embodiment. In FIG. 4C, multiple coupling fuses 412c-f are used to couple the first fuse 412a to the second fuse 412b to create the parachute. Each coupling fuse 412c-f may be backed with a heat shield 418 of flame retardant material, as discussed above. The coupling fuses 412c-f make the ignition redundant and may reduce the cutting time of the parachute. Further, multiple activation systems 414a, 414b may be used to further ensure the fuses 412a-f ignite and may further reduce the cutting time of the parachute.

Figure 4D:
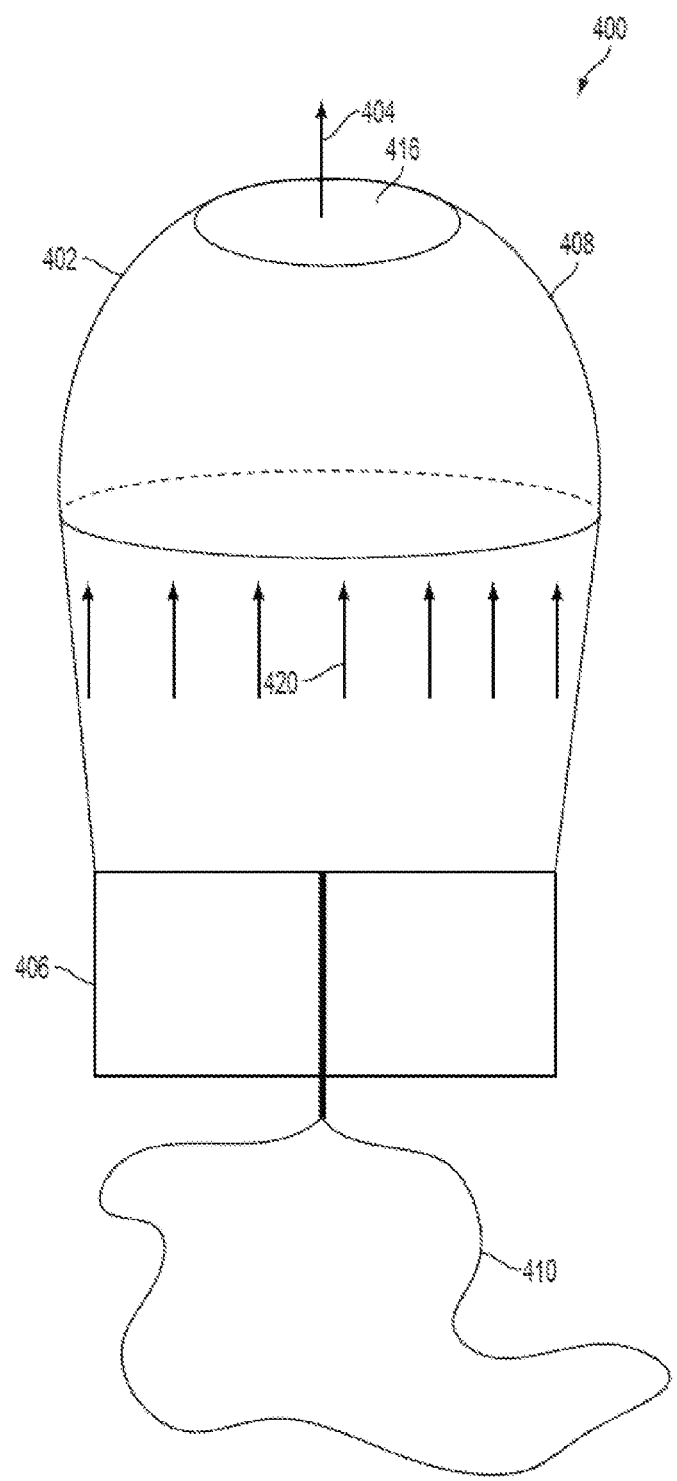
FIG. 4D is a side view of an activated parachute system, according to an exemplary embodiment.

FIG. 4D illustrates a side view of an activated parachute system of a balloon 400, according to an exemplary embodiment. Once cut away, the lower portion 410 of the envelope 402 may descend safely to the ground, or may simply hang from the payload 406 as shown in FIG. 4D. Ambient air 420 begins to fill the upper portion 408 of the envelope 402, and the upper portion 408 of the envelope 402 acts as a parachute to slow the descent of the balloon 400. In one embodiment, the apex of the envelope 402 may also be opened, creating a hole 416 at the top of the envelope 402 to allow the lift gas 404 to escape from the top of the envelope 402, as discussed above. As the lift gas 404 vents out of the hole 416 at the apex of the envelope 402, the balloon 400 accelerates and replaces the lift gas 404 with ambient air 420. The hole 416 at the apex of the envelope 402 may be created prior to cutting a substantially latitudinal line around the envelope 402 to create a zero pressure envelope 402 before activation of the parachute.

Figure 4E:
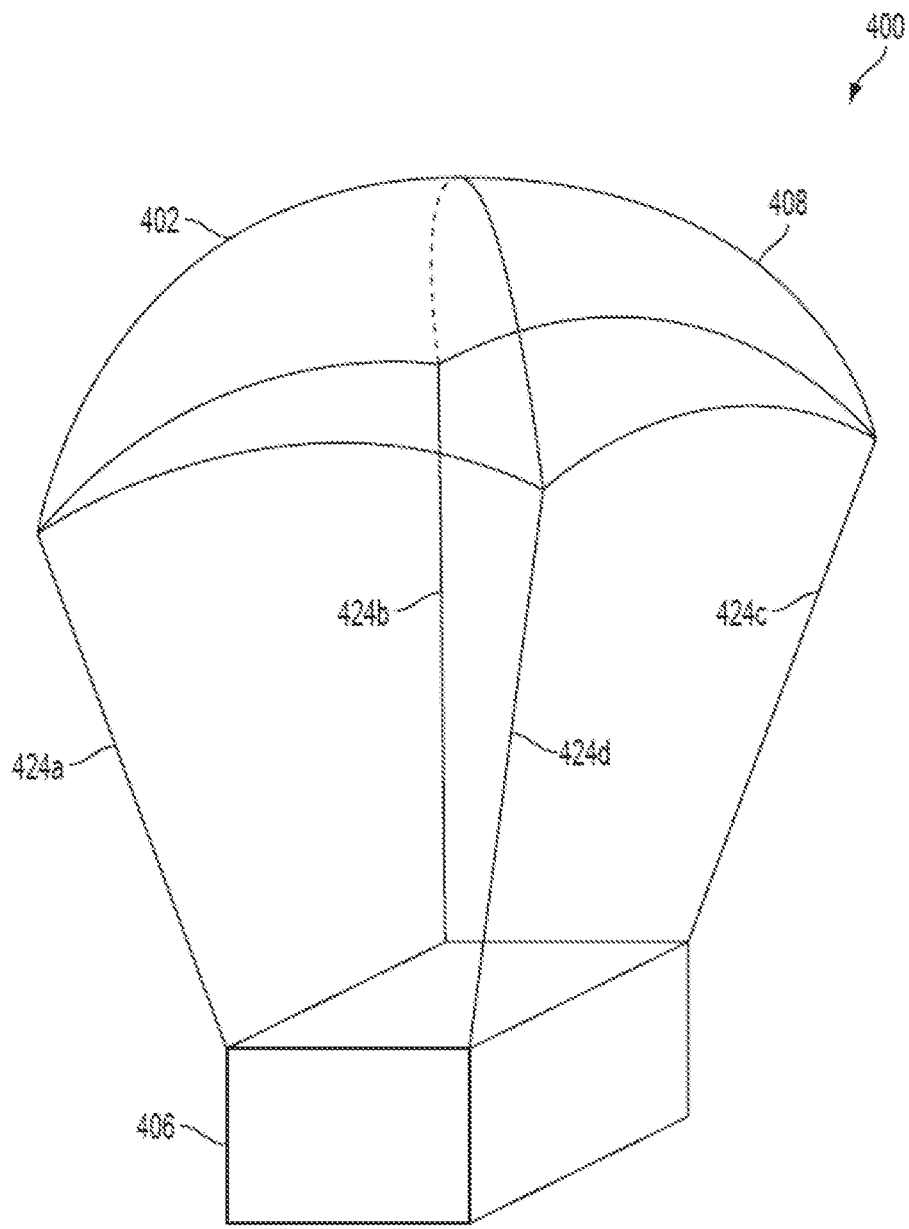
FIG. 4E is a perspective view of an activated parachute system, according to an exemplary embodiment.

FIG. 4E illustrates a perspective view of an activated parachute system of a balloon 400, according to an exemplary embodiment. The upper portion 408 of the envelope 402 may be attached to the payload 406 via four support lines 424a-d. The upper portion 408 of the envelope 402 acts as a parachute to slow the descent of the balloon 400.

Figure 4F:
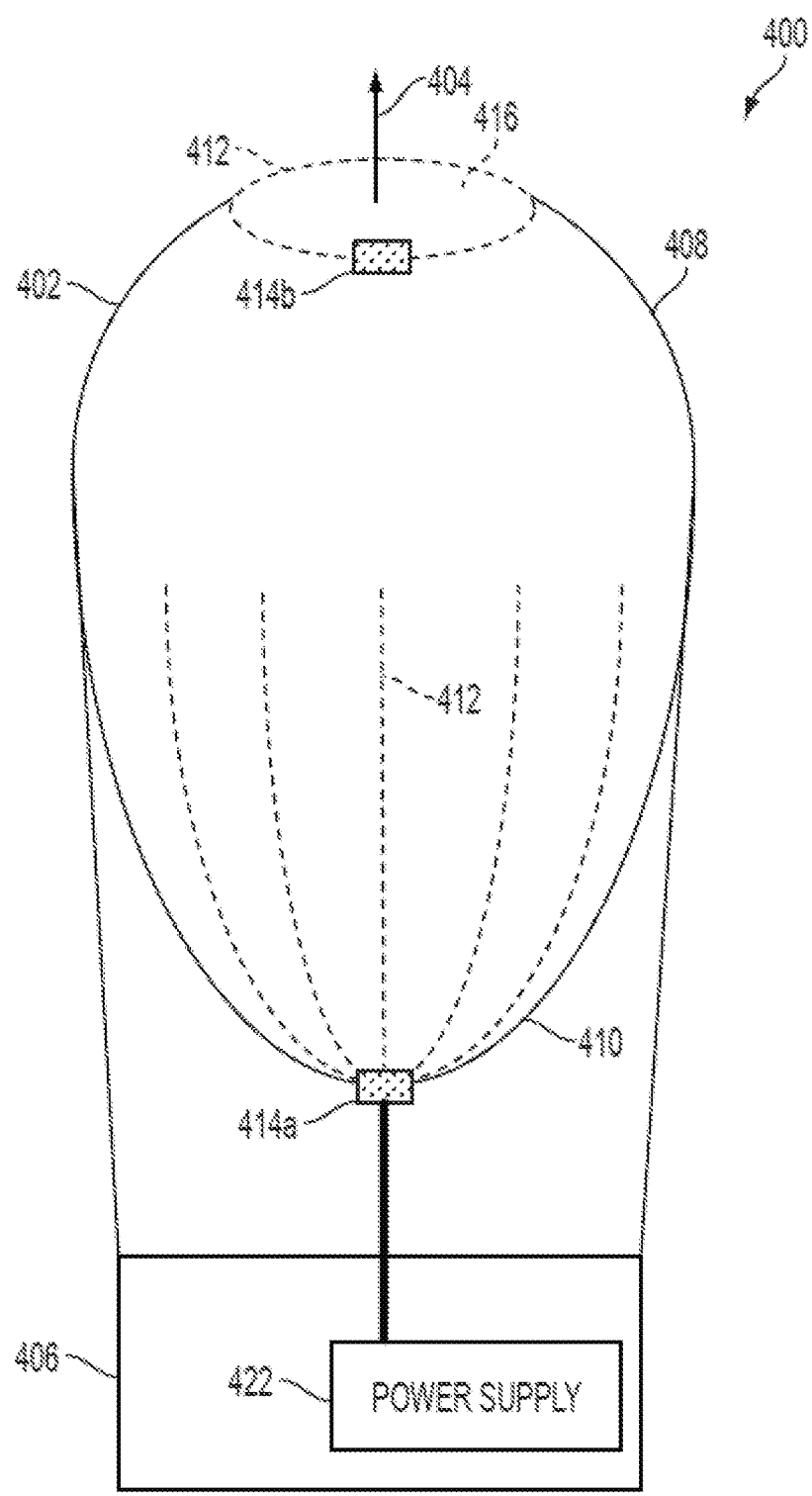
FIG. 4F is a side view of yet another example parachute system, according to an exemplary embodiment.

FIG. 4F illustrates a side view of yet another example parachute system of a balloon 400, according to an exemplary embodiment. The parachute system of FIG. 4F includes one or more fuses 412 along a substantially longitudinal line from the bottom of the envelope 402 to approximately the equator of the envelope 402. The one or more fuses 412 are coupled to an activation system 414a. As discussed above, the activation system 414a may include a resistance wire may be wrapped around the fuse, and may be connected to a power source. As shown in FIG. 4F, the power source may be the power supply 422 located on the payload 406. In another embodiment, the power source may be an independent 5V power source module.

In one embodiment, the activation system may be controlled remotely. For example, the application of the power source used to apply a current to the resistance wire may be controlled at ground level. In another embodiment, the activation system may be controlled by the processor of the balloon. Other embodiments are possible as well.

When the one or more fuses 412 are ignited, the one or more fuses 412 are configured to melt through the material of the envelope 402, creating one or more slots in the lower portion 410 of the envelope 402, and creating a parachute from the upper portion 408 of the envelope 402. A bottom surface of the upper portion 408 of the envelope 402 is configured to create drag to slow the descent of the payload 406 and the upper portion 408. The one or more slots in the lower portion 410 of the envelope 402 are configured to release the lift gas 404 from the envelope.

Further, the apex of the envelope 402 may also be opened, creating a hole 416 at the top of the envelope 402 to allow the lift gas 404 to escape from the top of the envelope 402. In one example, the hole 416 at the apex of the envelope 402 may be created by a rip panel, as discussed above. In another example, the hole 416 may be created by a fuse 412 and a second activation system 414b. The hole 416 at the apex of the envelope 402 may be created before cutting the slots in the lower portion 410 of the envelope 402 to create a zero pressure envelope 402 before activation of the parachute. As the lift gas 404 escapes from the top of the envelope 402 and the parachute is created by cutting away the lower portion 410 of the envelope 402, the balloon 400 begins to descend, replacing the lift gas 404 in the parachute with ambient air.

V. Examples of Methods

Figure 5:
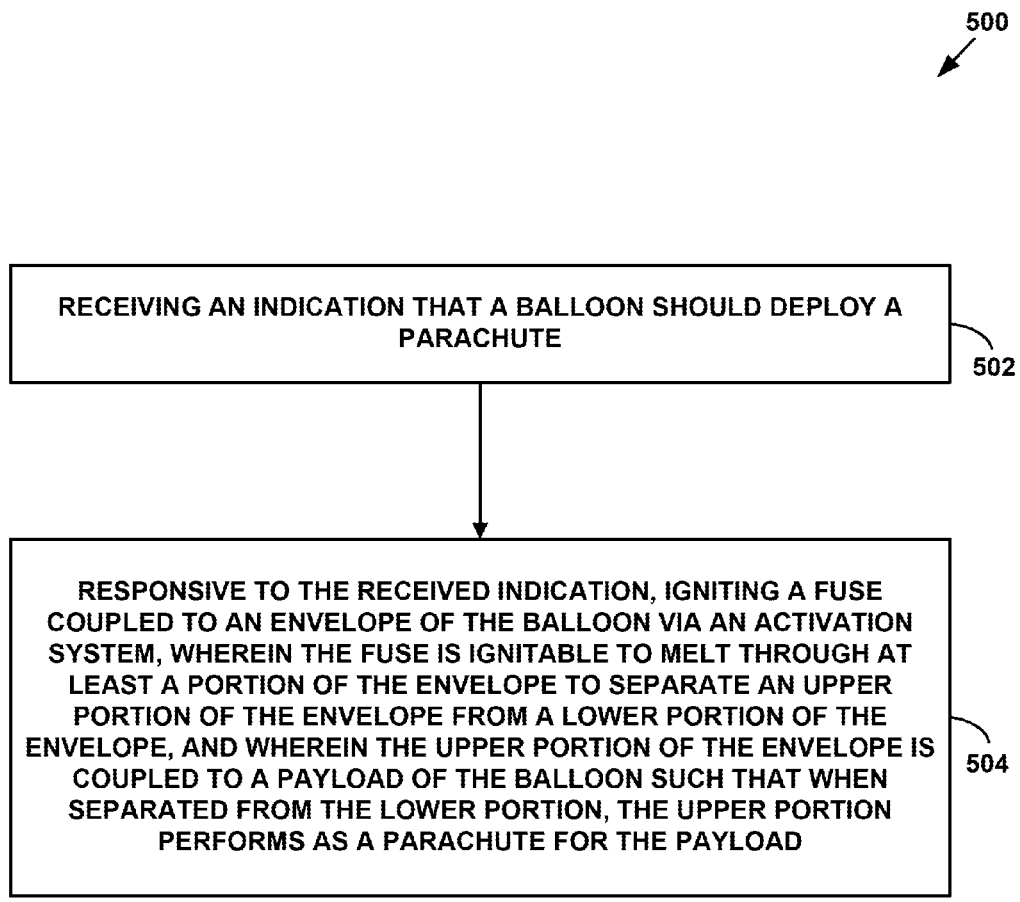
FIG. 5 depicts a flow chart, in accordance with an example embodiment.

FIG. 5 is a simplified flow chart illustrating method 500, according to an exemplary embodiment. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 502, method 500 involves receiving an indication that a balloon should deploy a parachute. In one embodiment, the indication that the balloon should deploy a parachute may be responsive to information from one or more sensors located on the payload of the balloon. For example, if the balloon is rapidly accelerating downward, an accelerometer located on the payload may send an indication to the balloon that the parachute should be deployed. In another example, a computer system on the payload may indicate when maintenance is due on systems within the payload, and/or when the power supply needs to be recharged or replaced, and responsively indicate that the balloon should deploy its parachute. In another embodiment, the indication that the balloon should deploy its parachute may be responsive to information from a ground-based station. For example, a ground-based station may detect inclement weather in the location of the balloon, and may indicate that the balloon should deploy its parachute to escape the weather. Other examples are possible as well.

At block 504, method 500 involves igniting a fuse coupled to an envelope of the balloon via an activation system. The fuse may include one or more fuses that are ignitable to melt through at least a portion of the envelope to separate an upper portion of the envelope from a lower portion of the envelope. The upper portion of the envelope is coupled to the payload of the balloon such that when separated from the lower portion, the upper portion performs as a parachute for the payload. The bottom surface of the upper portion of the envelope is configured to create drag to slow the descent of the payload and the upper portion. As discussed above, the activation system may include a resistance wire may be wrapped around the fuse, and may be connected to a power source. Further, the apex of the envelope may also be opened, creating a hole at the top of the envelope to allow the lift gas to escape from the top of the envelope. The hole at the apex of the balloon may be created by a rip panel, or by using an extension of the same line of fuse used to cut the parachute, as discussed above.

VI. A Non-Transitory Computer Readable Medium With Instructions to Cause the Activation System to Ignite the Fuse to Create a Parachute From the Envelope Some or all of the functions described above and illustrated in FIGS. 4A-5 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a computing device, such as the processor 313 illustrated in FIG. 3. Alternatively, the computing device that executes the stored instructions could be another computing device, such as a server in a server network, or a ground-based station.

The non-transitory computer readable medium may store instructions executable by the processor 313 to perform various functions. The functions could include causing the activation system ignite the fuse to create a parachute from the envelope.

VII. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A balloon comprising:
 a payload;
 an envelope filled with a lift gas; and
 a parachute system, wherein the parachute system comprises:
  a fuse coupled to the envelope; and
  an activation system coupled to the fuse, wherein the activation system is configured to ignite the fuse, wherein the fuse is ignitable to melt through at least a portion of the envelope to separate an upper portion of the envelope from a lower portion of the envelope, and wherein the upper portion of the envelope is coupled to the payload such that when separated from the lower portion, the upper portion performs as a parachute for the payload.

2. The balloon of claim 1, wherein a bottom surface of the upper portion of the envelope is configured to create drag to slow the descent of the payload and the upper portion.

3. The balloon of claim 1, wherein the fuse forms a path that traverses a circumference of the envelope, such that burning the fuse entirely separates the lower portion of the envelope from the upper portion of the envelope.

4. The balloon of claim 1, wherein the fuse coupled to the envelope comprises:
 one or more fuses arranged along a substantially longitudinal line from the bottom of the envelope to the equator of the envelope, wherein the ignited fuse creates one or more slots in the lower portion of the envelope configured to release the lift gas from the envelope.

5. The balloon of claim 1, wherein the activation system comprises:
 a resistance wire coupled to the fuse; and
 a power source connected to the resistance wire.

6. The balloon of claim 1, wherein the parachute system further comprises a rip panel at an apex of the envelope, wherein the rip panel is configured to create an opening at an apex of the envelope, and wherein the opening at the apex of the envelope is configured to release the lift gas from the envelope.

7. The balloon of claim 1, wherein the fuse coupled to the envelope comprises:
 a first fuse arranged along a substantially latitudinal line around the envelope;
 a second fuse arranged along a substantially latitudinal line around a top portion of the envelope; and
 a third fuse coupling the first fuse to the second fuse.

8. The balloon of claim 7, further comprising:
a flame retardant material located between the third fuse and the envelope, wherein the flame retardant material is configured to prevent the third fuse from melting the envelope.

9. The balloon of claim 7, wherein the ignited second fuse is configured to melt through the envelope to create an opening at an apex of the envelope, and wherein the opening at the apex of the envelope is configured to release the lift gas from the envelope.

10. A method comprising:
receiving an indication that a balloon should deploy a parachute; and
responsive to the received indication, igniting a fuse coupled to an envelope of the balloon via an activation system, wherein the fuse is ignitable to melt through at least a portion of the envelope to separate an upper portion of the envelope from a lower portion of the envelope, and wherein the upper portion of the envelope is coupled to a payload of the balloon such that when separated from the lower portion, the upper portion performs as a parachute for the payload.

11. The method of claim 10, wherein a bottom surface of the upper portion of the envelope is configured to create drag to slow the descent of the payload and the upper portion.

12. The method of claim 10, the fuse coupled to the envelope comprises:
one or more fuses coupled along a substantially longitudinal line from the bottom of the envelope to the equator of the envelope, wherein the ignited one or more fuses creates one or more slots in the lower portion of the envelope configured to release the lift gas from the envelope.

13. The method of claim 10, wherein the indication that the balloon should deploy a parachute is responsive to information from one or more sensors located on the payload of the balloon.

14. The method of claim 10, wherein the indication that the balloon should deploy a parachute is responsive to information from a ground-based station.

15. The method of claim 10, wherein the fuse coupled to the envelope comprises:
a first fuse arranged along a substantially latitudinal line around the envelope;
a second fuse arranged along a substantially latitudinal line around a top portion of the envelope; and
a third fuse coupling the first fuse to the second fuse.

16. The method of claim 15, wherein the ignited second fuse is configured to melt through the envelope to create an opening at an apex of the envelope, and wherein the opening at the apex of the envelope is configured to release a lift gas from the envelope.

17. An apparatus comprising:
a fuse coupled to an envelope of a balloon;
a resistance wire coupled to the fuse; and
a power source connected to the resistance wire, wherein the power source connected to the resistance wire is configured to ignite the fuse, wherein the fuse is ignitable to melt through at least a portion of the envelope to separate an upper portion of the envelope from a lower portion of the envelope, and wherein the upper portion of the envelope is coupled to a payload of the balloon such that when separated from the lower portion, a bottom surface of the upper portion of the envelope creates drag to slow the descent of the payload and the upper portion.

18. The apparatus of claim 17, wherein the fuse coupled to the envelope of the balloon comprises:
one or more fuses coupled along a substantially longitudinal line from the bottom of the envelope to the equator of the envelope, wherein the ignited one or more fuses creates one or more slots in the lower portion of the envelope configured to release the lift gas from the envelope.

19. The apparatus of claim 17, wherein the fuse coupled to the envelope comprises:
a first fuse arranged along a substantially latitudinal line around the envelope;
a second fuse arranged along a substantially latitudinal line around a top portion of the envelope; and
a third fuse coupling the first fuse to the second fuse; and
a flame retardant material located between the third fuse and the envelope, wherein the flame retardant material is configured to prevent the third fuse from melting the envelope.

20. The apparatus of claim 17, wherein the ignited second fuse is configured to melt through the envelope to create an opening at an apex of the envelope, and wherein the opening at the apex of the envelope is configured to release the lift gas from the envelope.

* * * * *